United States Patent [19]
Murakami et al.

[11] 3,765,913
[45] Oct. 16, 1973

[54] PHOTOTROPIC GLASS
[75] Inventors: Yoshio Murakami, Itami; Makoto Kume, Amagasaki, both of Japan
[73] Assignee: Nippon Sheet Glass Co., Ltd., Osaka, Japan
[22] Filed: Jan. 25, 1972
[21] Appl. No.: 220,715

Related U.S. Application Data
[63] Continuation-in-part of Ser. No. 821,978, May 5, 1969, abandoned.

[30] Foreign Application Priority Data
May 17, 1968 Japan.............................. 43/33331
July 10, 1968 Japan.............................. 43/48699

[52] U.S. Cl.................. 106/54, 106/53, 106/DIG. 6
[51] Int. Cl......... C03c 3/26, C03c 3/14, C03c 3/08
[58] Field of Search.................. 106/DIG. 6, 52, 53, 106/54, 39 DV

[56] References Cited
UNITED STATES PATENTS
3,548,060  12/1970  Suzuki et al. ................. 106/DIG. 6
3,197,296  7/1965   Eppler et al. .................. 106/DIG. 6
3,208,860  9/1965   Armistead et al. ............. 106/DIG. 6
2,150,694  3/1939   Morey.............................. 106/47 Q
3,653,933  4/1972   Tsunekawa......................... 106/54

OTHER PUBLICATIONS
Volf, M. B., Technical Glasses, London, 1961, pages 88, 132, 268, 411.

Primary Examiner—Helen M. McCarthy
Attorney—E. F. Wenderoth et al.

[57] ABSTRACT

A transparent and durable phototropic glass comprising a borosilicate glass body containing therein microcrystals of silver halide, copper oxide and lanthanum oxide, and process for making the phototropic glass which comprises melting a batch for the said glass body, forming and cooling the molten glass, heat treating said glass to cause the silver halide to crystallize, and cooling the glass.

2 Claims, No Drawings

PHOTOTROPIC GLASS

This application is a continuation-in-part of Serial No. 821,978, filed May 5, 1969, now abandoned.

This invention relates to a new phototropic glass and in particular to a transparent and durable phototropic glass which is promptly darkened by exposure to ultraviolet radiation or visible radiation of short wave-length but promptly reverts to its original state immediately after the radiation ceases.

Various phototropic glasses having a small amount of microcrystalline silver halides dispersed in their body have been known heretofore. Most of these are those whose body comprises silicate glass and, in general, they do not respond quickly to changes in light intensity, i.e. do not color and decolor immediately. A phototropic glass whose body comprises borate glass has been recently developed to obtain prompt coloration and decoloration. Such a phototropic glass comprising a borate glass body is disclosed in U.S. application Ser. No. 606,530 now Pat. No. 3,653,833. While this phototropic glass possesses superior properties with respect to its transparency and promptness of coloration and decoloration, it has the shortcoming that its durability is not quite satisfactory. When the durability of the glass is low, certain of its constituents result in the impairment of its transparency.

It has now been found that a phototropic glass containing borate glass in its body, i.e a phototropic glass comprising a borosilicate glass body, is improved remarkably in its durability by the incorporation in the glass body of a specified amount of lanthanum oxide.

It is therefore an object of the present invention to provide a phototropic glass comprising a borosilicate glass body which possesses prompt coloration and decoloration properties as well as improved durability. Another object is to provide a process for making such a glass.

In one aspect the invention comprises a phototropic glass comprising a glass body having an analysis of 30–80 mole % $B_2O_3$, 0.5–50 mole % $SiO_2$, the total amount of $B_2O_3$ plus $SiO_2$ being in the range of 60 – 85 mole percent, 5 – 20 mole % $Al_2O_3$, 1 – 12 mole % $La_2O_3$, 5 – 25 mole percent of at least one metallic oxide selected from BaO, SrO, PbO, ZnO and CaO, wherein the total amount of BaO and SrO combined is at least one-half of the total mole % of the metallic oxide, 0 – 10 mole percent of at least one alkali metal oxide, 0 – 3 mole % $TiO_2$ and 0 – 2 mole % $ZrO_2$, the glass also comprising at least 0.005 percent by weight of the glass body of copper oxide (reckoned as CuO) and at least 0.05 percent by weight of the glass body of microcrystals of at least one silver halide selected from AgBr and AgCl (reckoned as Ag).

As hereinabove indicated, the glass body according to the present invention is made of the principal constituents of $B_2O_3$, $Al_2O_3$, $La_2O_3$ and RO (where RO stands for BaO, SrO, PbO, ZnO or CaO) to which is added $SiO_2$ and, optionally, alkali metal oxides such as $Li_2O$, $Na_2O$ or $K_2O$, $TiO_2$ and $ZrO_2$.

The addition of a small amount of $SiO_2$ is effective in stabilizing the glass, i.e. in inhibiting the information of haze in the glass. This effect is particularly pronounced when the $Al_2O_3$ content exceeds 16 mole percent. An amount of the $SiO_2$ up to 50 mole percent is usable. On the other hand, the amount of $B_2O_3$ used is in the range of 30 – 80 mole percent. However, the total amount of $B_2O_3$ plus $SiO_2$ must be held within the range of 60 – 85 mole percent. This means that when the amount of $B_2O_3$ is greater than 30 mole percent but less than 60 mole percent, $SiO_2$ is present at the same time and the sum total of the two constituents is in the range of 60 – 85 mole percent. When the foregoing range is deviated from, problems such as either non-vitrification, clouding of glass or uneven coloration upon exposure of the resulting phototropic glass occur.

As concerns the $Al_2O_3$ constituent, when this is below 5 mole percent, not only does the forming of the glass become difficult but also the structure of the glass tends to become non-uniform. On the other hand, when the $Al_2O_3$ exceeds 20 mole percent, there is the drawback that insoluble portions tend to form in the glass.

The $La_2O_3$ constituent plays an important role in improving the durability of the phototropic glass. When the amount of this constituent is less than one mole percent, the intended improvement in durability is not fully achieved, whereas when the content of $La_2O_3$ exceeds 12 mole percent, the photosensitivity of the glass is depressed.

The amount of the RO constituent ranges 5 – 25 mole percent. At less than 5 mole percent, vitrification does not take place fully and insoluble portions are formed. On the other hand, when the 25 mole percent limit is exceeded, formation of a homogeneous glass becomes difficult. In addition, not only is the molding operation rendered difficult but also the unevenness of the darkening of the glass upon exposure to light is aggravated.

A further requirement in the case of the RO constituent is that at least one-half of its total mole percent must be accounted for by either BaO or SrO or a mixture of these. When these conditions are not satisfied, not only does haze tend to form in the glass during its after heat treatment, but also a satisfactory photosensitivity cannot be obtained.

The effect of improvement in the durability of the glass by means of the $La_2O_3$ is further enhanced in the case where PbO is present as the RO constituent. Therefore, PbO is preferably present in the glass. Further, since a large amount of CaO tends to depress the photosensitivity of the glass, it is preferable, although not required, that the CaO be held to below two-fifths of the total mole percent of the RO constituent.

Although the alkali metal oxides need not necessarily be added, they have the effect of making the melting of the glass composing materials easier as well as lowering the heat treatment temperature after the formation of the glass. Up to 10 mole percent of these alkali metal oxides can be added. The presence in the glass of an amount exceeding the foregoing amount has adverse effects on the durability of the glass.

As other constituents, up to 3 mole percent of $TiO_2$ and up to 2 mole percent of $ZrO_2$ can be incorporated. These constituents cooperate with the foregoing $La_2O_3$ in improving the durability of the glass. However, when the content of $TiO_2$ exceeds 3 mole percent, the transparency of the glass suffers, whereas when the amount of $ZrO_2$ exceeds 2 percent the photosensitivity of the glass is depressed.

The phototropic glass of this invention contains dispersed in the glass body comprising the various aforesaid constituents, a minute quantity of microcrystalline silver halide and a minute quantity of copper oxide. The microcrystals of the silver halide and copper oxide constituents appear to be mainly responsible for the phototropic property of the glass. Photosensitivity is not obtained if the silver halide alone is used, a small amount of copper oxide being essential. The silver halide may be the chloride or bromide, or both. The amount of silver halide must be at least 0.05 percent by weight, calculated as silver, based on the glass body. If it is less than this value, the density of coloration attainable is too small for the glass to be really useful. The density of coloration attained on exposure increases nearly proportionately to the amount of silver halide present up to about 1.7 weight percent of silver halide, calculated as silver, but above this concentration the density of coloration becomes almost constant. Hence, the presence of more than about 1.7 weight percent of silver halide, calculated as silver, is not economical. The amount of the copper oxide, reckoned as CuO, is at least 0.005 percent by weight based on the glass body. An increase above 0.05 percent by weight does not demonstrate any marked improvement in the photosensitivity. Thus, no advantage is obtained by the use of more than 0.05 percent by weight of copper oxide.

The phototropic glass of the present invention described above possesses an excellent phototropic property as well as improved durability.

In another aspect the invention comprises a process for making a phototropic glass according to the invention, which comprises forming a molten batch of the borosilicate glass body of the specified composition containing the silver halide and copper oxide in the specified proportions, shaping and cooling the molten glass to solidify it, heating or holding the glass at a temperature of 550° – 770°C. for a time at least sufficient to cause the silver halide to crystallize, and cooling the glass.

In the process of the invention, the starting materials for preparing the borosilicate glass body may be those used in making conventional borate glass, for example, boric acid, aluminum hydroxide, lanthanum oxide and alkaline earth metal carbonates, which are converted to their respective oxides in the melting step. To produce the silver halide, it is possible to include a non-halide silver salt, e.g. silver nitrate, and an alkali metal halide such as sodium or potassium bromide or chloride in the charge to thus form the silver halide in the melting step. Because the loss of the alkali metal halide during melting is greater than the loss of the silver salt by volatilization, it is preferred to add a stoichiometric excess of the alkali metal halide over the silver salt. The melting conditions may be those customarily used, the starting materials being heated for 1 to 6 hours at a temperature of 1,150° to 1,300°C. in air or other oxidizing atmosphere. Temperature and times above or below these limits are undesirable, since when they are below the lower limits, bubbles tend to remain in the resulting molten glass, whereas when they are above the upper limits, the amounts of boric oxide and halides volatilized become large.

The molten glass obtained in this manner is formed into a suitable shape and coated. The so obtained glass is then heat treated at 550 – 700°C. A part of the silver halide contained in the glass is formed into very minute crystals by this heat treatment, with the consequence that photosensitivity is imparted to the glass. With heat treatment below 550°C. photosensitivity is not obtained, while with heat treatment above 700°C. transparency of the glass is impaired. A period of time suitable for the heat treatment is from one-half to 3 hours. The heat-treated glass is then cooled.

The following example illustrates the invention.

Before presenting the example, however, the tests for the phototropic property and durability to which the samples of glass produced in the example were submitted will be described.

The phototropic property was tested by determining the optical transmittance of the glass plate before and after exposure for a period of 90 seconds to a light radiation. A 150-watt xenon lamp was used as the light source which was separated from the sample by a distance of about 7 centimeters. $T_o$ and $T_{15}$ obtained as a result of the test represent respectively the transmissions to visible light of the glass plate before and after exposure to the xenon lamp radiation, expressed in percent. And hft represents the half-fading time in seconds at which the concentration of color centers after the stopping of exposure to the light radiation is at one-half that at equilibrium. More specifically for instance, in case the initial transmission ($T_o$) is 90 percent and the transmission ($T_{15}$) after 90 seconds radiation is 50 percent, the time that it takes for the transmission to recover to $\sqrt{T_o \times T_{15}} = \sqrt{90 \times 50} = 67$ is referred to as half-fading time (hft). This provides a measure of the rate of fading of the darkened glass or its ability to regain its original transmission. Each of these tests was conducted at room temperature on samples 3.7 mm in thickness.

The durability test was carried out in the following manner. The sample glass plate is dipped for one hour in boiling distilled water, then held for 2 hours at 100°C. in a dryer, and thereafter the matter adhering to the surfaces of the sample is wiped off. The weight of the glass plate before and after this treatment is weighed and the difference, i.e. the decrease in weight, in milligrams per square centimeter is designated as the durability.

In accordance with the present invention phototropic glasses can be obtained which exhibit a weight loss of less than 10 mg/cm$^2$, including the range 0.2 – 6.0 mg/cm$^2$, thus providing an extremely durable glass.

Example:

The several starting materials in the amounts specified in Table 1 were charged to a crucible which was then placed in a furnace and heated for 1 to 6 hours at 1,150 to 1,300°C. in an atmosphere of air to melt the batch. Thus were produced the corresponding glass samples Nos. 1 – 30 indicated in Table 2 having an analysis in mole % of the constituents as shown. These glasses contained in all instances, aside from the glass body constituents indicated in the table, based on the weight of said glass body, 0.5% of Ag, 0.5% of Br and 0.3% of Cl, as well as 0.01% of CuO. The crucible was then removed from the furnace, and the molten glass was flowed onto a stainless steel plate to form it into a sheet, which was then allowed to stand and solidify. After this sheet was heat treated in a furnace under the conditions shown in Table 3, it was allowed to cool. The results of the phototropic property test of these glass samples are shown in Table 3.

The durability test was conducted on several of these samples with the results shown in Table 4. From these results it can be seen that the phototropic glass of this invention possesses excellent durability.

TABLE 1

| Number | B₂O₃ | Al(OH)₃ | BaCO₃ | Pb₃O₄ | ZnO | La₂O₃ | SiO₂ | Other | | AgBr | NaCl | CuO mixture* |
|---|---|---|---|---|---|---|---|---|---|---|---|---|
| 1 | 104.1 | 51.3 | 32.5 | 24.0 | | 18.2 | 78.9 | | | 3.3 | 0.6 | 2.6 |
| 2 | 119.2 | 70.4 | 37.3 | 5.6 | 2.0 | 20.5 | 59.9 | | | 3.3 | 0.6 | 2.6 |
| 3 | 139.5 | 81.9 | 43.5 | 12.8 | 4.6 | 23.9 | 35.1 | | | 3.3 | 0.6 | 2.6 |
| 4 | 139.5 | 81.9 | 43.5 | 6.4 | 2.3 | 23.9 | 35.1 | | | 3.3 | 0.6 | 2.6 |
| 5 | 139.7 | 68.3 | 57.3 | 8.0 | 2.9 | 23.9 | 35.1 | | | 3.3 | 0.6 | 2.6 |
| 6 | 140.2 | 71.0 | 116.8 | 11.2 | 4.0 | 27.4 | 10.3 | | | 3.3 | 0.6 | 2.6 |
| 7 | 146.0 | 71.0 | 71.9 | 10.4 | 3.7 | 99.2 | 9.0 | | | 3.3 | 0.6 | 2.6 |
| 8 | 152.4 | 89.5 | 47.7 | 7.2 | 2.6 | 26.2 | 18.9 | | | 3.3 | 0.6 | 2.6 |
| 9 | 159.7 | 31.1 | 125.1 | | | 54.7 | 10.1 | | | 3.3 | 0.6 | 2.6 |
| 10 | 159.7 | 51.9 | 78.8 | 23.2 | | 54.7 | 10.1 | | | 3.3 | 0.6 | 2.6 |
| 11 | 159.7 | 51.9 | 59.4 | 45.6 | | 54.7 | 10.1 | | | 3.3 | 0.6 | 2.6 |
| 12 | 159.7 | 51.9 | 59.4 | 23.2 | 8.3 | 54.7 | 10.1 | | | 3.3 | 0.6 | 2.6 |
| 13 | 159.7 | 78.1 | 39.4 | 15.2 | 5.4 | 54.7 | 10.1 | | | 3.3 | 0.6 | 2.6 |
| 14 | 159.7 | 78.1 | 39.4 | 9.6 | 3.4 | 27.4 | 10.1 | Li₂CO₃ | 9.8 | 3.3 | 0.6 | 2.6 |
| 15 | 159.7 | 78.1 | 39.4 | 30.4 | | 54.7 | 10.1 | | | 3.3 | 0.6 | 2.6 |
| 16 | 159.7 | 78.1 | 39.4 | | 10.8 | 54.7 | 10.1 | | | 3.3 | 0.6 | 2.6 |
| 17 | 159.7 | 78.1 | 52.5 | 15.2 | | 54.7 | 10.1 | | | 3.3 | 0.6 | 2.6 |
| 18 | 159.7 | 78.1 | 52.5 | 9.6 | 3.4 | 27.4 | 10.1 | CaCO₃ | 6.7 | 3.3 | 0.6 | 2.6 |
| 19 | 159.7 | 78.1 | 58.7 | 9.6 | 3.4 | 27.4 | 10.1 | Na₂CO₃ | 3.7 | 3.3 | 0.6 | 2.6 |
| 20 | 159.7 | 78.1 | 52.5 | | 5.4 | 54.7 | 10.1 | | | 3.3 | 0.6 | 2.6 |
| 21 | 159.7 | 78.1 | 62.2 | 9.6 | 3.4 | 27.4 | 10.1 | K₂CO₃ | 2.4 | 3.3 | 0.6 | 2.6 |
| 22 | 159.7 | 78.1 | 65.6 | | | 54.7 | 10.1 | | | 3.3 | 0.6 | 2.6 |
| 23 | 159.7 | 78.1 | 65.6 | | 6.8 | 27.4 | 10.1 | | | 3.3 | 0.6 | 2.6 |
| 24 | 159.7 | 78.1 | 65.6 | 19.2 | | 27.4 | 10.1 | | | 3.3 | 0.6 | 2.6 |
| 25 | 159.7 | 78.1 | | 9.6 | 3.4 | 27.4 | 10.1 | SrCO₃ | 49.1 | 3.3 | 0.6 | 2.6 |
| 26 | 159.7 | 93.9 | 49.1 | | 2.6 | 27.4 | 10.1 | K₂CO₃ | 4.4 | 3.3 | 0.6 | 2.6 |
| 27 | 159.7 | 93.9 | 49.7 | | 5.1 | 27.4 | 10.1 | | | 3.3 | 0.6 | 2.6 |
| 28 | 159.9 | 85.7 | 58.0 | 8.0 | 2.9 | 27.4 | 10.1 | | | 3.3 | 0.6 | 2.6 |
| 29 | 167.0 | 81.4 | 68.4 | 10.4 | 3.7 | 28.5 | 1.1 | | | 3.3 | 0.6 | 2.6 |
| 30 | 182.8 | 36.6 | 41.5 | 8.0 | 2.9 | 27.4 | 10.1 | Li₂CO₃ | 5.2 | 3.3 | 0.6 | 2.6 |

*CuO mixture: 99 parts B₂O₃ (included in quantity shown in "B₂O₃" column) 1 part CuO.

TABLE 2

| Number | B₂O₃ | Al₂O₃ | BaO | PbO | ZnO | La₂O₃ | SiO₂ | Other | |
|---|---|---|---|---|---|---|---|---|---|
| 1 | 43.8 | 9.4 | 4.7 | 3.0 | | 1.6 | 37.5 | | |
| 2 | 50.0 | 12.9 | 5.4 | 0.7 | 0.7 | 1.8 | 28.5 | | |
| 3 | 58.3 | 15.0 | 6.3 | 1.6 | | 2.1 | 16.7 | | |
| 4 | 58.3 | 15.0 | 6.3 | 0.8 | 0.8 | 2.1 | 16.7 | | |
| 5 | 58.4 | 12.5 | 8.3 | 1.0 | 1.0 | 2.1 | 16.7 | | |
| 6 | 58.6 | 13.0 | 16.9 | 1.4 | 2.8 | 2.4 | 4.9 | | |
| 7 | 61.0 | 13.0 | 10.4 | 1.3 | 1.3 | 8.7 | 4.3 | | |
| 8 | 63.6 | 16.4 | 6.9 | 0.9 | 0.9 | 2.3 | 9.0 | | |
| 9 | 66.6 | 5.7 | 18.1 | | | 4.8 | 4.8 | | |
| 10 | 66.6 | 9.5 | 11.4 | 2.9 | | 4.8 | 4.8 | | |
| 11 | 66.6 | 9.5 | 8.6 | 5.7 | | 4.8 | 4.8 | | |
| 12 | 66.6 | 9.5 | 8.6 | 2.9 | 2.9 | 4.8 | 4.8 | | |
| 13 | 66.6 | 14.3 | 5.7 | 1.9 | 1.9 | 4.8 | 4.8 | | |
| 14 | 66.6 | 14.3 | 5.7 | 1.2 | 1.2 | 2.4 | 4.8 | Li₂O | 3.8 |
| 15 | 66.6 | 14.3 | 5.7 | 3.8 | | 4.8 | 4.8 | | |
| 16 | 66.6 | 15.3 | 6.7 | | 3.8 | 4.8 | 4.8 | | |
| 17 | 66.6 | 14.3 | 7.6 | 1.9 | | 4.8 | 4.8 | | |
| 18 | 66.6 | 14.3 | 7.6 | 1.2 | 1.2 | 2.4 | 4.8 | CaO | 1.9 |
| 19 | 66.6 | 14.3 | 8.5 | 1.2 | 1.2 | 2.4 | 4.8 | Na₂O | 1.9 |
| 20 | 66.6 | 14.3 | 7.6 | | 1.9 | 4.8 | 4.8 | | |
| 21 | 66.6 | 14.3 | 9.0 | 1.2 | 1.2 | 2.4 | 4.8 | K₂O | 0.5 |
| 22 | 66.6 | 14.3 | 9.5 | | | 4.8 | 4.8 | | |
| 23 | 66.6 | 14.3 | 9.5 | | 2.4 | 2.4 | 4.8 | | |
| 24 | 66.6 | 14.3 | 9.5 | 2.4 | | 2.4 | 4.8 | | |
| 25 | 66.6 | 14.3 | | 1.2 | 1.2 | 2.4 | 4.8 | SrO | 9.5 |
| 26 | 66.6 | 17.2 | 7.1 | | 0.9 | 2.4 | 4.8 | K₂O | 0.9 |
| 27 | 66.6 | 17.2 | 7.2 | | 1.8 | 2.4 | 4.8 | | |
| 28 | 66.7 | 15.7 | 8.4 | 1.0 | 1.0 | 2.4 | 4.8 | | |
| 29 | 69.6 | 14.9 | 9.9 | 1.3 | 1.3 | 2.5 | 0.5 | | |
| 30 | 76.1 | 6.7 | 6.0 | 1.0 | 1.0 | 2.4 | 4.8 | Li₂O | 2.0 |

TABLE 2A

| | Weight percent | | | | | | | | |
|---|---|---|---|---|---|---|---|---|---|
| Number | B₂O₃ | Al₂O₃ | BaO | PbO | ZnO | La₂O₃ | SiO₂ | Other | |
| 1 | 37.30 | 11.73 | 8.82 | 8.20 | | 6.37 | 27.58 | | |
| 2 | 42.78 | 16.17 | 10.18 | 1.92 | 0.70 | 7.20 | 21.05 | | |
| 3 | 47.20 | 17.79 | 11.23 | 4.15 | | 7.95 | 11.67 | | |
| 4 | 47.83 | 18.03 | 11.38 | 2.11 | 0.77 | 8.06 | 11.83 | | |
| 5 | 47.25 | 14.82 | 14.78 | 2.59 | 0.94 | 7.95 | 11.67 | | |
| 6 | 42.44 | 13.79 | 26.95 | 3.25 | 2.37 | 8.13 | 3.06 | | |
| 7 | 39.86 | 12.44 | 14.96 | 2.72 | 0.99 | 26.60 | 2.42 | | |
| 8 | 50.76 | 19.18 | 12.13 | 2.30 | 0.84 | 8.59 | 6.20 | | |
| 9 | 47.10 | 5.90 | 28.19 | | | 15.89 | 2.93 | | |
| 10 | 47.06 | 9.83 | 17.74 | 6.57 | | 15.87 | 2.92 | | |
| 11 | 46.15 | 9.64 | 13.12 | 12.66 | | 15.57 | 2.87 | | |
| 12 | 48.01 | 10.03 | 13.65 | 6.70 | 2.44 | 16.19 | 2.98 | | |
| 13 | 49.32 | 15.52 | 9.30 | 4.51 | 1.65 | 16.64 | 3.06 | | |
| 14 | 54.42 | 17.12 | 10.26 | 3.15 | 1.15 | 9.18 | 3.38 | Li₂O | 1.34 |
| 15 | 47.95 | 15.09 | 9.04 | 8.77 | | 16.17 | 2.98 | | |
| 16 | 50.78 | 15.98 | 9.57 | | 3.38 | 17.13 | 3.15 | | |
| 17 | 48.62 | 15.30 | 12.22 | 4.45 | | 16.40 | 3.02 | | |
| 18 | 53.32 | 16.78 | 13.40 | 3.08 | 1.13 | 8.99 | 3.51 | CaO | 1.23 |
| 19 | 52.48 | 16.51 | 14.75 | 3.03 | 1.11 | 8.85 | 3.26 | Na₂O | 0.70 |
| 20 | 50.03 | 15.74 | 12.57 | | 1.67 | 16.88 | 3.11 | | |
| 21 | 51.76 | 16.29 | 15.40 | 2.99 | 1.09 | 8.73 | 3.21 | K₂O | 0.52 |
| 22 | 49.31 | 15.51 | 15.48 | | | 16.63 | 3.06 | | |
| 23 | 52.59 | 16.55 | 16.51 | | 2.21 | 8.87 | 3.27 | | |
| 24 | 50.63 | 15.93 | 15.90 | 5.85 | | 8.54 | 3.14 | | |
| 25 | 54.45 | 17.13 | | 3.15 | 1.15 | 9.18 | 3.38 | SrO | 11.55 |
| 26 | 53.26 | 20.14 | 12.50 | | 0.84 | 8.98 | 3.30 | K₂O | 0.98 |
| 27 | 53.23 | 20.13 | 12.67 | | 1.69 | 8.98 | 3.31 | | |
| 28 | 52.14 | 17.97 | 14.46 | 2.50 | 0.91 | 8.78 | 3.23 | | |
| 29 | 53.11 | 16.66 | 16.64 | 3.18 | 1.16 | 8.93 | 0.33 | | |
| 30 | 63.56 | 8.19 | 11.04 | 2.68 | 0.97 | 9.38 | 3.46 | Li₂O | 0.72 |

TABLE 3

| No. | $T_0$ (%) | $T_{15}$ (%) | hft (sec) | Heat treatment conditions |
|---|---|---|---|---|
| 1 | 90 | 43 | 56 | 650°C, 30 min. |
| 2 | 90 | 54 | 32 | 675°C, 30 min. |
| 3 | 90 | 47 | 30 | 675°C, 30 min. |
| 4 | 90 | 52 | 30 | 675°C, 30 min. |
| 5 | 90 | 54 | 25 | 650°C, 30 min. |
| 6 | 90 | 65 | 16 | 650°C, 30 min. |
| 7 | 87 | 49 | 80 | 675°C, 30 min. |
| 8 | 90 | 42 | 36 | 675°C, 30 min. |
| 9 | 88 | 68 | 21 | 650°C, 30 min. |
| 10 | 90 | 45 | 60 | 650°C, 30 min. |
| 11 | 88 | 50 | 90 | 650°C, 30 min. |
| 12 | 90 | 59 | 65 | 650°C, 30 min. |
| 13 | 88 | 47 | 68 | 675°C, 30 min. |
| 14 | 90 | 47 | 57 | 625°C, 30 min. |
| 15 | 88 | 41 | 95 | 650°C, 30 min. |
| 16 | 89 | 62 | 45 | 650°C, 30 min. |
| 17 | 89 | 37 | 70 | 675°C, 30 min. |
| 18 | 88 | 40 | 43 | 650°C, 30 min. |
| 19 | 88 | 40 | 50 | 650°C, 30 min. |
| 20 | 90 | 52 | 38 | 675°C, 30 min. |
| 21 | 88 | 44 | 36 | 650°C, 30 min. |
| 22 | 90 | 41 | 40 | 675°C, 30 min. |
| 23 | 88 | 38 | 60 | 650°C, 30 min. |
| 24 | 90 | 34 | 70 | 650°C, 30 min. |
| 25 | 90 | 51 | 65 | 650°C, 30 min. |
| 26 | 90 | 51 | 27 | 675°C, 30 min. |
| 27 | 90 | 57 | 14 | 675°C, 30 min. |
| 28 | 90 | 53 | 26 | 650°C, 30 min. |
| 29 | 90 | 50 | 30 | 650°C, 30 min. |
| 30 | 87 | 43 | 45 | 650°C, 30 min. |

TABLE 4

| No. | Durability (mg/cm$^2$) |
|---|---|
| 2 | 1.0 |
| 4 | 1.8 |
| 8 | 3.9 |
| 9 | 6.0 |
| 10 | 5.2 |
| 11 | 3.5 |
| 12 | 2.6 |
| 13 | 0.4 |
| 15 | 1.3 |
| 16 | 0.2 |
| 17 | 2.6 |
| 20 | 2.3 |
| 22 | 3.5 |
| 23 | 5.0 |
| 24 | 2.1 |

We claim:

1. A transparent and durable phototropic glass exhibiting a weight loss of less than 10 mg/cm$^2$ when dipped for one hour in boiling distilled water, held for two hours at 100°C in a dryer and then freed of matter adhering to its surfaces, which glass consists essentially of a glass body having an analysis of 30 – 80 mole % $B_2O_3$, 0.5 – 50 mole % $SiO_2$, the total amount of $B_2O_3$ and $SiO_2$ being 60 – 85 mole percent, 5 – 20 mole % $Al_2O_3$, 1 – 12 mole % $La_2O_3$, 5 – 25 mole percent of at least one metallic oxide selected from the group consisting of BaO, SrO, PbO, ZnO and CaO, wherein the total amount of BaO and SrO is at least one-half the total mole percent of the metallic oxides and 0 – 10 mole percent of at least one alkali metal oxide, the glass containing also at least 0.005 percent by weight of the glass body of copper oxide, calculated as CuO, and at least 0.05 percent by weight of the glass body of microcrystals of at least one silver halide selected from the group consisting of AgBr and AgCl, calculated as Ag.

2. The glass according to claim 1, wherein the amount of PbO present is 0.7 – 5.7 mole percent and the amount of CaO present is less than 10.0 mole percent.

* * * * *